(No Model.)
J. DOUGHERTY.
GLASS HEADED DOOR KNOB.
No. 245,612.          Patented Aug. 16, 1881.
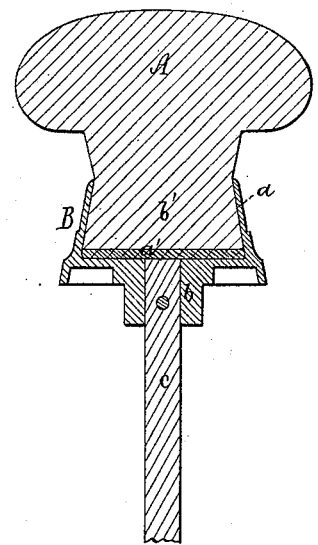
Witnesses.
Inventor.
John Dougherty
by R. H. Eddy atty

UNITED STATES PATENT OFFICE.

JOHN DOUGHERTY, OF SOMERVILLE, MASSACHUSETTS.

GLASS-HEADED DOOR-KNOB.

SPECIFICATION forming part of Letters Patent No. 245,612, dated August 16, 1881.

Application filed December 27, 1880. (No model.)

*To all whom it may concern:*

Be it known that I, JOHN DOUGHERTY, of Somerville, of the county of Middlesex and State of Massachusetts, have invented a new and useful Improvement in the Manufacture of Glass-Headed Knobs; and I do hereby declare the same to be described in the following specification and represented in the accompanying drawing, which is a transverse section of a knob of my improved kind.

The knob-head A is united to the socketed metallic shank-piece B by casting or pressing the glass, when in a molten state, into the socket $a$ of such piece B. The shank-piece, besides being socketed to receive the neck of the glass head A, has a bore, $b$, for reception of a spindle, $c$, and the socket $a$ is tapering or larger in diameter at its base than at its mouth.

The object of my present invention is to mask the bottom of the socket $a$ and the opening into such or any projection from such bottom into the socket when there may be any such, so that such bottom, or it and the opening or projection, shall not be seen by an observer on looking into the knob-head, which is transparent.

When the neck of a glass knob-head is secured in the socket-piece by plaster or cement, a disk of metallic foil is usually first placed within the socket, such serving to mask the bottom thereof, but such foil cannot be used to practical advantage when the glass head is blown or pressed in a molten state into the socket-piece, as the foil will be destroyed or melted or injured by the great heat of the glass.

In carrying out my invention, I first place within the socket-piece, so as to cover the bottom of its socket, a thin mask or mass of opaque glass, of any desirable color, after which I press into the socket and upon the said mass or mask the molten glass to form the neck or balance of the neck of the head. The opaque mask and the transparent glass will generally unite, and together form the neck of the head, the transparent glass being pressed into the socket and upon the mask while the latter may be at a very high temperature or in a molten or nearly molten state. In the drawing the mask is shown at $a'$ and the neck of the knob-head at $b'$.

In a knob made in accordance with my invention no cement or plaster is used to connect the neck of the head to the socket-piece, such connection being due to the glass being pressed in a molten state into the socket, so as to fill it. The socket, being tapering, prevents the neck, when solid, from being drawn out of it, and thus with a knob of my improved kind there is no danger of cement giving away, so as to cause a separation of the socket-piece and the glass head. When the knob-socket is provided with one or more projections, to prevent the knob-head shank from turning in the socket such projection or projections should be masked like the bottom of the socket by means as described.

I claim—

The combination of a metallic socket-piece and a mask of opaque or colored glass arranged therein, with a knob-head of transparent glass, having its neck pressed in a molten state into such socket-piece, such mask being for the purpose set forth.

JOHN DOUGHERTY.

Witnesses:
R. H. EDDY,
E. B. PRATT.